Figure 1:
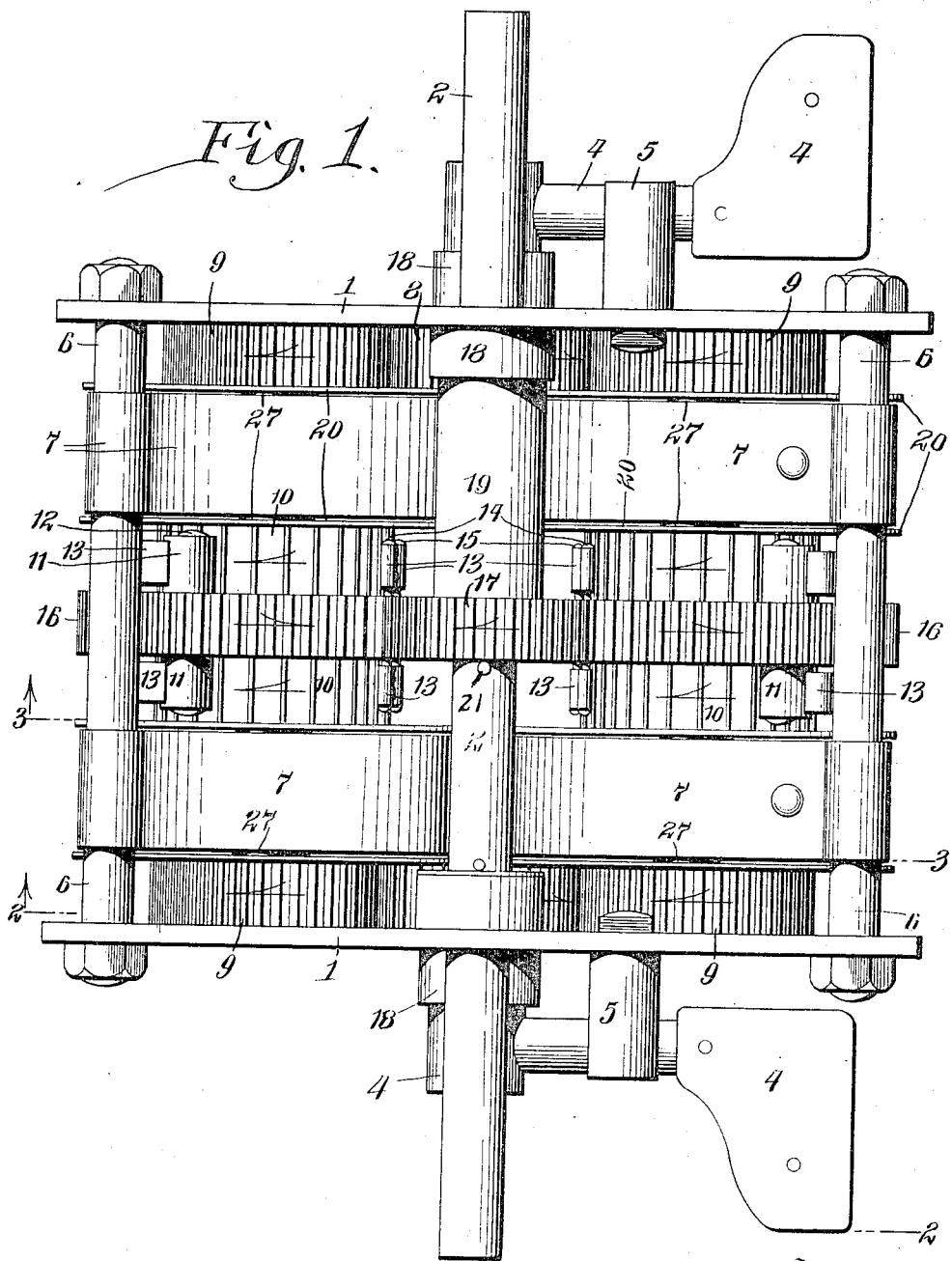

F. WOODS.
SELF STARTING ATTACHMENT FOR AUTOMOBILES.
APPLICATION FILED MAR. 18, 1918.

1,289,031.

Patented Dec. 24, 1918.
3 SHEETS—SHEET 1.

Inventor
Frank Woods
By Jerry A Mathews
and Lester L Sargent
Attorneys

F. WOODS.
SELF STARTING ATTACHMENT FOR AUTOMOBILES.
APPLICATION FILED MAR. 18, 1918.
1,289,031.
Patented Dec. 24, 1918.
3 SHEETS—SHEET 2.
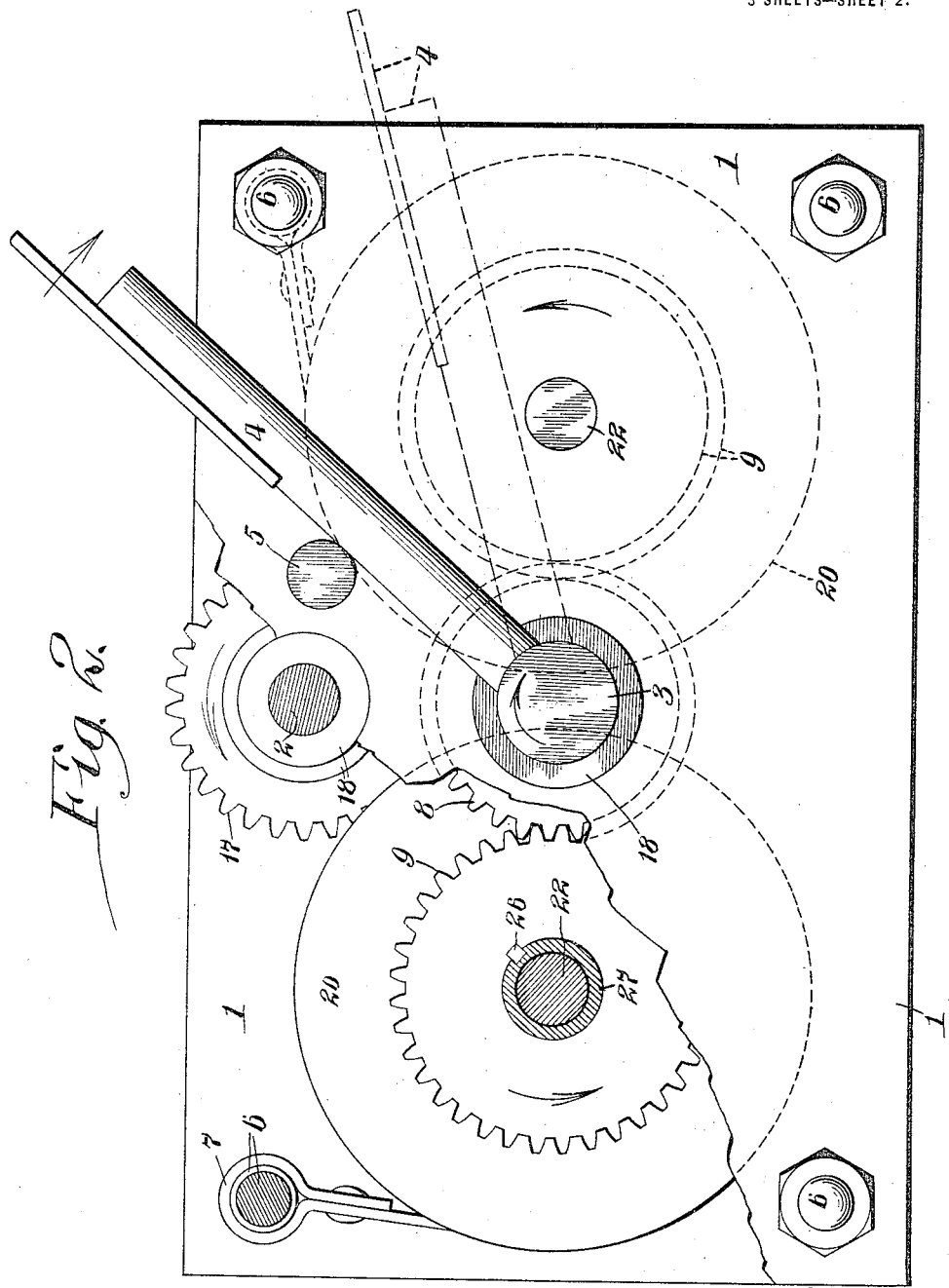
Inventor
Frank Woods

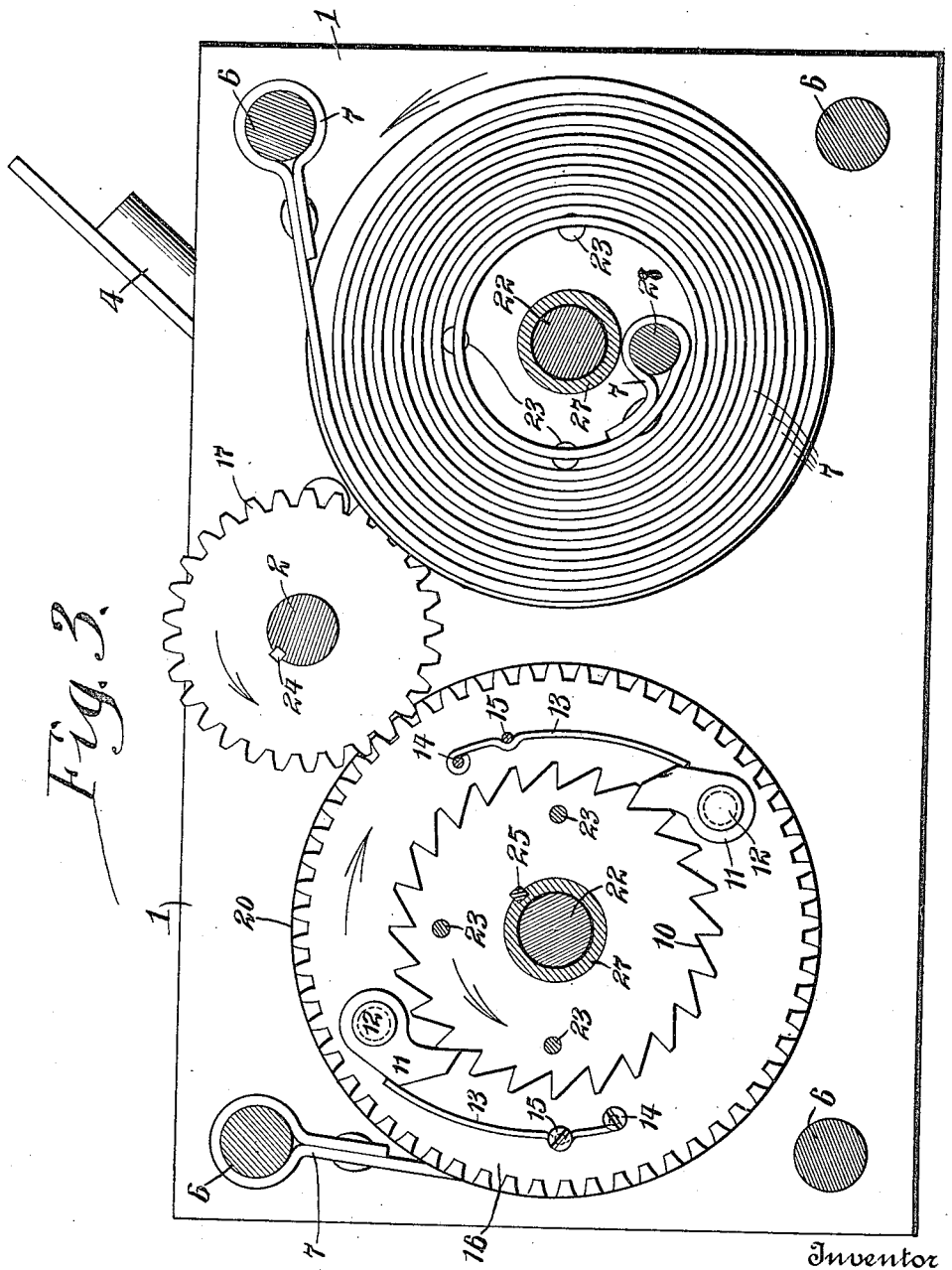

UNITED STATES PATENT OFFICE.

FRANK WOODS, OF PAINTSVILLE, KENTUCKY.

SELF-STARTING ATTACHMENT FOR AUTOMOBILES.

1,289,031.

Specification of Letters Patent. Patented Dec. 24, 1918.

Application filed March 18, 1918. Serial No. 223,122.

*To all whom it may concern:*

Be it known that I, FRANK WOODS, a citizen of the United States, residing at Paintsville, in the county of Johnson and State of Kentucky, have invented a new and useful Self-Starting Attachment for Automobiles, of which the following is a specification.

The object of my invention is to provide a novel self starter which may be readily operated by the foot, and which in case of back firing of the engine can not injure the operator.

In the accompanying drawings illustrating my invention, Figure 1 is a top plan of the starting unit; Fig. 2 is a front elevation thereof, partly broken away, and indicated by line 2—2 of Fig. 1; and Fig. 3 is a vertical section on line 3—3 of Fig. 1.

Like numerals designate like parts throughout the several views:

Referring to the accompanying drawings, I provide suitable frame plates 1, in the upper portion of which is mounted a suitable driven shaft 2 for delivering power to the automobile engine, to which it may be suitably attached in different ways as desired, as by a cog wheel attached to the shaft outside the plates, on one or both sides as desired, or by a sprocket wheel and chain, as the circumstances may demand, the means of attachment not being illustrated in the accompanying drawings. I further provide a suitable drive pedal shaft 3, to the outer ends of which are attached suitable foot or pedal levers 4. The return movement of foot levers 4 is limited by suitable stop studs 5 which are mounted in plates 1. I provide suitable stationary frame bars 6, to which are attached one end of the several clock springs 7, of which I prefer to provide four, as illustrated in Fig. 1. Mounted on drive pedal shaft 3 are pedal gears 8. On either side of pedal gear 8, I provide spur gears 9 which are keyed to sleeve 27 by key 26, as shown in Fig. 2. Four spur gears 9 are provided, driven by the two pedal gears 8. Also mounted on sleeve 27, I provide ratchet wheels 10 which are keyed to the sleeve by a suitable key 25, as shown in Fig. 3. Four ratchet wheels are provided. Interposed between adjacent ratchet wheels is a large driving gear 16, loosely floating on shaft 22. Gears 16, of which there are two, mesh with a small driven gear 17, which is keyed to the driven shaft 2 by a key 24, shaft 2 being the member by which power is transmitted to the automobile engine through suitable connections with the engine.

Attached to gear 16 by a suitable pivot pin 12 is a ratchet dog 11 adapted to engage ratchet wheel 10, against which it is pressed by a suitable flat spring 13, which is secured to a post 14, a pressure post 15 also being provided to hold spring 13 pressed against dog 11.

As indicated in the drawings, I provide suitable bearings 18 for shaft 2, and similar suitable bearings 18 for shaft 3, as shown in Fig. 2. As shown in Fig. 1, I provide a suitable spacing sleeve 19 on shaft 1, which together with pin 21 holds gear 17 in place. Suitable guiding plates 20, as shown in Figs. 1 and 2, are provided for the respective clock springs 7. I provide suitable pins 23 securing guiding plates 20 to ratchet 10; the guiding plates moving with the ratchets when the device is operated.

In operation, the cranking of the engine is performed by the foot of the operator, which presses down either of the pedal levers 4, thus rotating shaft 3 in a forward direction as indicated by the arrow in Fig. 2, thus actuating the pedal gear 8 adjacent to the particular pedal lever operated. Gear 8 in turn meshes with and drives spur gears 9 in a direction similar to each other but the reverse of that in which gear 8 and pedal lever 4 are moving. Gears 9 being keyed to sleeve 27, to which ratchets 10 are also keyed, the ratchets 10 nearest spur gears 9 move synchronously with and in the same direction as those gears. On the foot lever 4 being released and while it and gears 9 and ratchets 10 are returning to their original position dogs 11 engage the ratchet teeth and as dogs 11 are mounted to gears 16, they cause those gears to rotate with the ratchet 10 during the return movement of the foot lever. Gears 16 in turn mesh with gear 17 which is keyed to the driven shaft 2 which is operatively connected with the engine. As shaft 2 rotates in a reverse direction from gears 16 and away from the pedal lever, in the event of the engine back-firing the effect on the attachment would be to throw the foot lever forward and away from the foot so that no injury would occur to the person operating the attachment. It will be observed that gears 16 have similar dogs 11 mounted on opposite sides of the gear, as shown in Fig. 1, and that the respective dogs 11 similarly engage ratchet 10; in consequence of which arrangement gears 16, and thus gear 17 and shaft 2, are actuated when either of the foot levers 4 are operated, or it is possible to operate both simultaneously if desired. The inner ends of the coiled springs 7 may be operatively connected with plates 20, ratchet 10 and gear 9 by any suitable means, such as pin 28; or the spring may be directly attached to sleeve 27, to which gear 9 and ratchet 10 are keyed, whereby the spring will actuate gear 9 to cause it and ratchet 10 to return to their former positions on release of foot lever 4.

I claim:

1. In a self-starting attachment for an automobile, the combination of a foot lever, a drive pedal shaft, a casing in which said shaft is mounted, a pedal gear carried by the shaft, spur gears on opposite sides of the pedal gear and driven thereby, sleeve members to which said gears are keyed, ratchets keyed to the same sleeve members, coiled springs actuating the gears and ratchets, spur gears, spring-pressed dogs mounted on the spur gears and adapted to engage the ratchets on the return movement of the foot lever to rotate the spur gears, an intermediate gear driven by the spur gears, and a driven shaft on which said gear is mounted, said shaft being operatively connected with the engine, for the purposes described.

2. In a self-starting attachment for an automobile, the combination of a driven shaft operatively connected with the engine, a driven gear mounted on said shaft, a spur gear meshing with said driven gear, one or more dogs mounted on the spur gear, a ratchet adapted to be engaged by the dog, a spring holding the dog to the ratchet, a sleeve to which the ratchet is keyed, a shaft on which the sleeve is loosely mounted, a second gear keyed to the aforesaid sleeve, a spring arranged to actuate the ratchet and gear to the extent permitted, a drive pedal shaft, a gear carried by the drive pedal shaft and actuated by the gear keyed to the sleeve member, frame members in which the aforesaid mechanism is mounted, a foot lever, and a stop member positioned to limit the movement of the foot lever, substantially as and for the purposes set forth.

3. In a self-starting attachment for an automobile, the combination of a driven shaft operatively connected with the engine, gears operatively connected with said shaft, ratchet wheels, spring controlled dogs operatively connecting the ratchet wheels and gears to actuate the latter, means operatively connecting the ratchet wheels with a drive pedal shaft, spring mechanism arranged to rotate the ratchets to their initial position after being operated, frame members in which the aforesaid mechanism is mounted, and one or more foot levers mounted on the drive pedal shaft.

4. In a self-starting attachment for an automobile, the combination of frame plates, bars connecting the plates, opposite coiled springs attached to the bars, stationary shafts mounted in the frame plates, sleeves loosely mounted on the shafts mentioned, a gear and a ratchet spaced apart from each other and mounted on each of said sleeves to which they are keyed, guide plates interposed between the aforesaid gear and ratchet and the adjacent coiled spring, means for operatively attaching the inner end of the coiled spring to the aforesaid ratchets gear and sleeve, one or more spring controlled dogs riding over the ratchet and adapted to actuate same, a gear on which the aforesaid dogs are mounted and which is driven when the dogs engage the ratchet teeth, a driven gear actuated by the aforesaid gear, a driven shaft carrying said driven gear said shaft being suitably connected to the engine, one or more foot levers, stop members limiting the return movement of the foot levers, a drive pedal shaft to which the foot levers are affixed, and a gear mounted on the drive pedal shaft and operatively connecting that member with the gear carried by the sleeve, the aforesaid mechanism being arranged and operatively connected substantially as shown and for the purpose of cranking the engine by foot levers which will be rotated away from the foot of the operator in the event of the engine back-firing.

FRANK WOODS.

Attest:
RALPH STAFFORD,
JAMES B. LEMASTER.

Copies of this patent may be obtained for five cents each, by addressing the "Commissioner of Patents, Washington, D. C."